United States Patent [19]
Kuo et al.

[11] Patent Number: 5,732,199
[45] Date of Patent: Mar. 24, 1998

[54] CONTROL METHOD AND DEVICE OF SCANNER WITH BUILT-IN PLUG-AND-PLAY PRINTER PORT

[75] Inventors: Poe Kuo, Shin Dien; Frank Ho, Taipei, both of Taiwan

[73] Assignee: Behavior Tech Computer Corporation, Taipei, Taiwan

[21] Appl. No.: 715,844

[22] Filed: Sep. 25, 1996

[51] Int. Cl.$^6$ ........................................... G06F 15/00
[52] U.S. Cl. ..................... 395/114; 358/442; 395/200.1; 395/200.6; 395/200.9
[58] Field of Search ........................... 395/113, 114, 395/101, 200.1, 200.2, 200.6, 200.9; 358/442, 468

[56] References Cited

U.S. PATENT DOCUMENTS

| | | | |
|---|---|---|---|
| 5,299,314 | 3/1994 | Gates | 395/200 |
| 5,490,283 | 2/1996 | Chin | 395/893 |

*Primary Examiner*—Thomas D. Lee
*Assistant Examiner*—Jerome Grant, II
*Attorney, Agent, or Firm*—Morton J. Rosenberg; David I. Klein; Jun Y. Lee

[57] ABSTRACT

A control device for controlling the switching operation between a scanner having built-in printer port to which a printer is connected and the printer is disclosed. The control device has a computer connector for connection with the parallel port of the computer to receive control bus signals, status bus signals and data bus signals therefrom. The control bus and status bus signals are applied to the printer and the scanner through latches and tri-state buffers which are controlled respectively by the scanner and the printer. The two control units receive the data bus signals from the computer and perform decoding operation on the data received to enable/disable the latches and tri-state buffers so as to activate/de-activate the printer and scanner. The control device initially activates the printer with the scanner off, storing the control signals on the control bus of the computer, sending a first data signal to the control units to latch the control bus and status bus from the computer to the printer, sending a second data signal to the control units to open the control bus and status to the scanner, sending a third data signal to the control units to latch the control bus and the status bus to the scanner when a scanning operation is done, and sending a fourth data signal to the control units to release the control bus and status bus to the printer to activate the printer again.

24 Claims, 6 Drawing Sheets

CONTROL METHOD AND DEVICE OF SCANNER WITH BUILT-IN PLUG-AND-PLAY PRINTER PORT

FIELD OF THE INVENTION

The present invention relates to a scanner having built-in plug-and-play (PnP) printer port to connect to a PnP printer and in particular to a control device and the control method thereof for controlling the switching operation between the scanner and the printer.

DESCRIPTION OF THE RELATED PRIOR ART BACKGROUND

Nowadays, scanners are designed to be ready to install and use. A so-called printer port scanner has been developed to be connected to the printer port (or parallel port) of a computer and no SCSI or other scanner interface card is needed between the scanner and the computer. This is a quite user friendly design. Nevertheless, disadvantages exists. The most obvious problem encountered by such a design is that since the printer port of the computer is occupied by the scanner, there is no way to install the printer. To solve such a problem, there has been developed a scanner with built-in printer port for the connection with a printer so that the scanner and the printer share the same parallel port of the computer.

On the other hand, with the advent of WINDOW 95 operation system, the computer peripheral devices have been upgraded to the so-called plug-and-play (PnP) design. The conventional design of the scanner with built-in printer port is no longer able to handle the switching operation between the scanner and the PnP printer.

The compatibility problem of the conventional design is that the built-in printer port of the scanner that is available in the market nowadays comprises switching circuit designed on the basis of standard printer port (SPP) specification. In other words, the printer can only communicate with the scanner under the SPP specification and the printer of EPP or ECP specifications cannot be used. This violates the essence of plug-and-play design.

Conventionally, the switching operation is performed on the basis of the logic level of the selection signal SLCT_IN from the computer. Namely, when the SLCT_IN signal is low, the printer is activated and when the SLCT_IN signal is high, it is switched to the scanner. Using the selection signal SLCT_IN as the basis of switching further limits such a design to be only applicable to SPP mode, for the EPP or ECP may specify the selection signal in different ways which do not allow the selection signal to be modified arbitrarily.

It is therefore desirable to provide a control device and the control method thereof for controlling the switching operation between the printer and the scanner which is not only suitable for SPP printer, but also applicable to EPP or ECP PnP printers.

OBJECTS OF THE INVENTION

A primary object of the present invention is to provide a device and method for controlling the switching operation between a scanner having built-in printer port and a printer connected to the printer port, wherein control units receive identification codes via the data bus and decode the identification to perform a multiplexing switching operation between the printer and the scanner, rather than using the control signal from the printer port of a computer to determine the activation of and switching between the printer and the scanner, so as to eliminate the compatibility problem encountered in the prior art.

Another object of the present invention is to provide a device and method for controlling the switching operation between a scanner having built-in printer port to which a printer is connected and the printer by means of identification codes sent along the data bus, which device and method are well suitable for SPP printer.

A further object of the present invention is to provide a method for controlling the switching operation between a scanner having built-in printer port to which a printer is connected and the printer, wherein an off-line status of both the printer and the scanner is provided between the on-line status of the printer and the on-line status of the scanner to avoid signal interference.

A further object of the present invention is to provide a method for controlling the switching operation between a scanner having built-in printer port to which a printer is connected and the printer, wherein to switch from printer-on and scanner-off condition to printer-off and scanner-off condition is achieved by alternately repeating two sets of data a given times, such as alternately repeating hexadecimal E6 and E7 sixteen times, and thus mis-switching event may not occur.

A further object of the present invention is to provide a method for controlling the switching operation between a scanner having built-in printer port to which a printer is connected and the printer, wherein to switch the printer-off and scanner-off condition to printer-off and scanner-on condition is achieved by sending a second identification code via the data bus, such as hexadecimal E2 when the strobe signal of the control bus is going from logic high level to logic low level.

A further object of the present invention is to provide a method for controlling the switching operation between a scanner having built-in printer port to which a printer is connected and the printer, wherein to switch the printer-off and scanner-on condition to the printer-off and scanner-off condition is achieved by sending a third identification code via the data bus, such as hexadecimal E3 when the strobe signal of the control bus is going from logic high level to logic low level.

A further object of the present invention is to provide a method for controlling the switching operation between a scanner having built-in printer port to which a printer is connected and the printer, wherein to switch the scanner-off and printer-off condition to scanner-off and printer-on condition is achieved by sending a fourth identification code via the data bus, such as sequential hexadecimal E8 and E9.

The features and advantages of the present invention will be readily understood from the following description of a preferred embodiment, together with the control method associated therewith, reference being had to the attached drawings, wherein:

DETAILED DESCRIPTION OF THE PREFERRED EMBODIMENT

Figure 1:
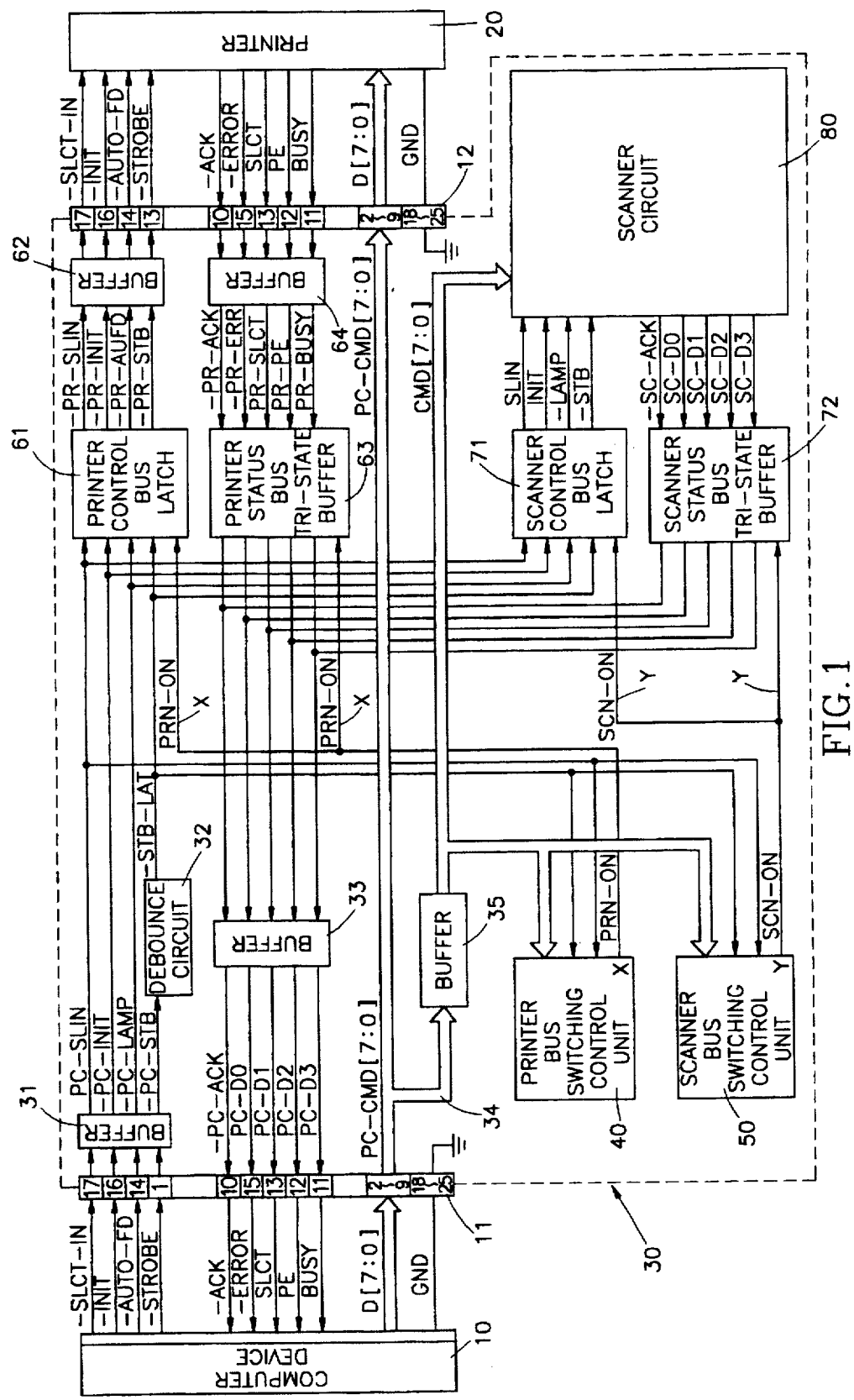
FIG. 1 shows a control block diagram of the switching control device in accordance with the present invention.

With reference to FIG. 1, wherein a scanner control device having built-in plug-and-play (PnP) printer port in accordance with the present invention, generally designated with reference numeral 30, is shown and indicated with phantom line box for illustration purpose which is a control circuit to be arranged inside a scanner, the scanner control device 30 comprises a scanner circuit 80 for the scanning operation and a printer connector 12 to which a PnP printer 20 may be connected. The scanner control device 30 further comprises a computer connector 11 for connection with parallel port (or printer port) of a computer device 10, such as a personal computer (PC).

The connectors 11 and 12 have three segments respectively corresponding to control bus, status bus and data bus of the parallel port of the computer 10. The control bus of the computer 10 provides control signals which include at least a selection signal SLCT_IN, an automatic feed signal AUTO_FD and a strobe signal STROBE. The data bus of the computer 10 provides data bit signals CDM0–CDM7.

The control device 30 comprises buffers 31 and 62 connected between the computer connector 11 and the printer connector 12 along the control bus. Also, buffers 33 and 64 are connected between the computer connector 11 and the printer connector 12 along the status bus. It should be noted that the buffers 31, 33, 62 and 64 may be removed, if desired.

A debounce circuit 32 is connected to the strobe terminal of the computer connector 11 for eliminating unnecessary oscillation of the strobe signal STROBE and providing a debounced strobe signal STB_LAT.

The control bus of the computer 10 is connected to the printer 20 and scanner circuit 80 via a printer control bus latch 61 and a scanner control bus latch 71. The status bus of the computer 10 is connected to the printer 20 and the scanner circuit 80 via a printer status bus tri-state buffer 63 and a scanner status bus tri-state buffer 72. These control bus latches 61 and 71 and the tri-state buffers 63 and 72 are in connection with a printer bus switching control unit 40 and a scanner bus switching control unit 50 via signal X which indicates printer-on PRN_ON and signal Y which indicates scanner-on SCN_ON so that the two control units 40 and 50 control the activation and ON/OFF status of the printer 20 and the scanner 80. The data bus from the computer 10 is directly connected to the printer 20 and applied to the two control units 40 and 50 and the scanner circuit 80 via the buffer 35. The control units 40 and 50 will be further described.

In accordance with the present invention, with the above circuit arrangement, the switching operation between the printer 20 and the scanner 80 is controlled by identification codes sent through the data bus of the computer 10 which are sent to the two control units 40 and 50 via the buffer 35. The two control units 40 and 50 perform decoding operation on the identification codes to determine the activation/de-activation of the printer 20 and the scanner 80 so as to achieve selective switching operation between the printer 20 and the scanner 80.

The control bus selection signal SLCT_IN and strobe signal STROBE generated by the computer 10 are also applied to the two control units 40 and 50. These two signals are not used to directly activate/de-activate the printer 20 and the scanner 80 and instead, they are in fact serving status checking purpose only. In other words, in accordance with the present invention, the switching operation between the printer 20 and the scanner 80 is done on the basis of the data input from the computer 10 and completely independent of the logic level of the selection signal SLCT_IN which is conventionally used as the selection basis.

As shown in FIG. 1, the control bus, status bus and data bus are directly connected from the computer 10 to the printer 20 so that the functioning and operation of the printer 20 are not affected by different specifications of the parallel port of the computer 10. Thus, besides the SPP printers, the present invention is also applicable to PnP printer of EPP or ECP specifications. This solves the compatibility problem encountered in the prior art.

Figure 2A:
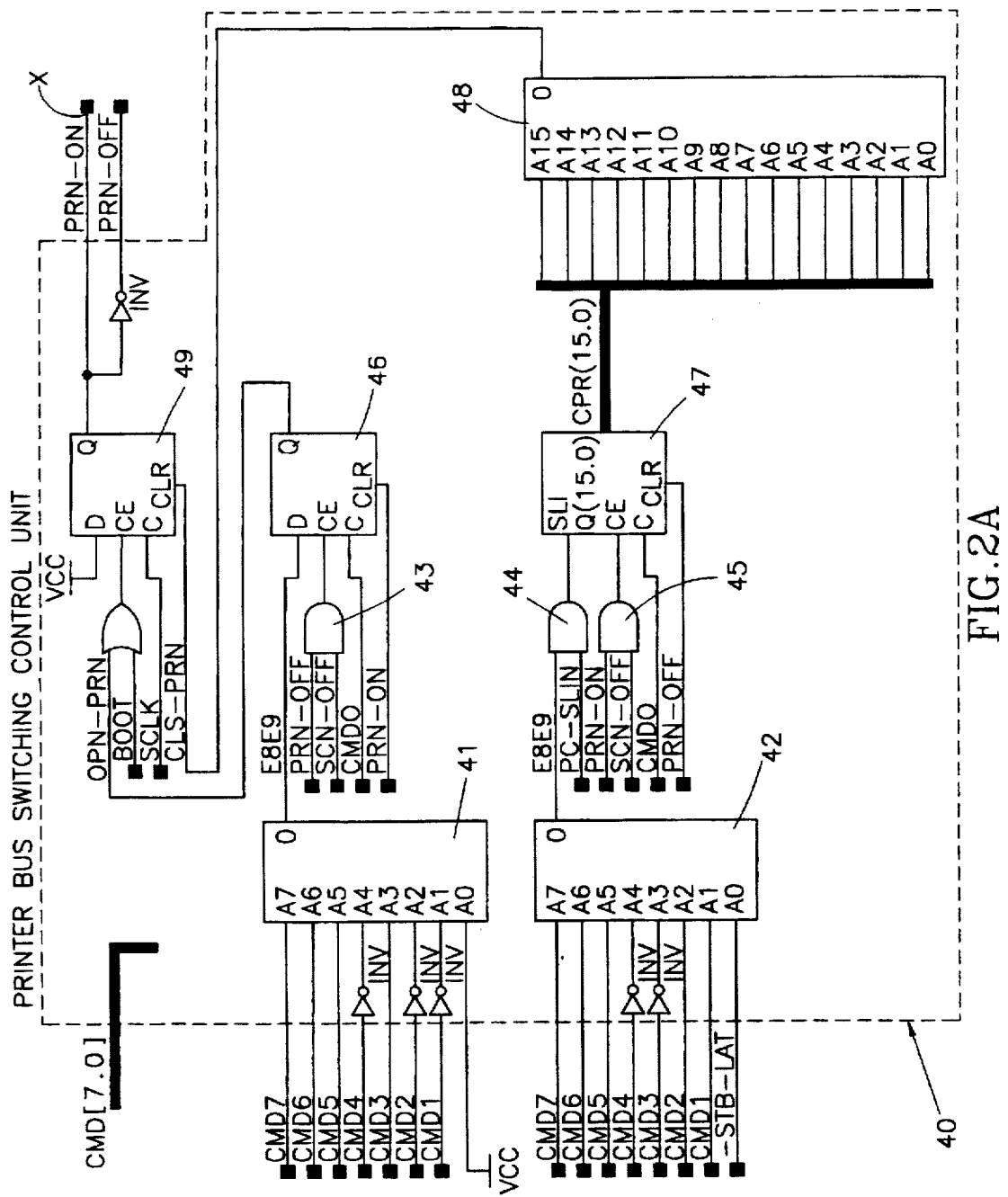
FIGS. 2A and 2B respectively show detailed circuit diagram of the printer bus switching control unit and the scanner bus switching control unit of the present invention.
Figure 2B:
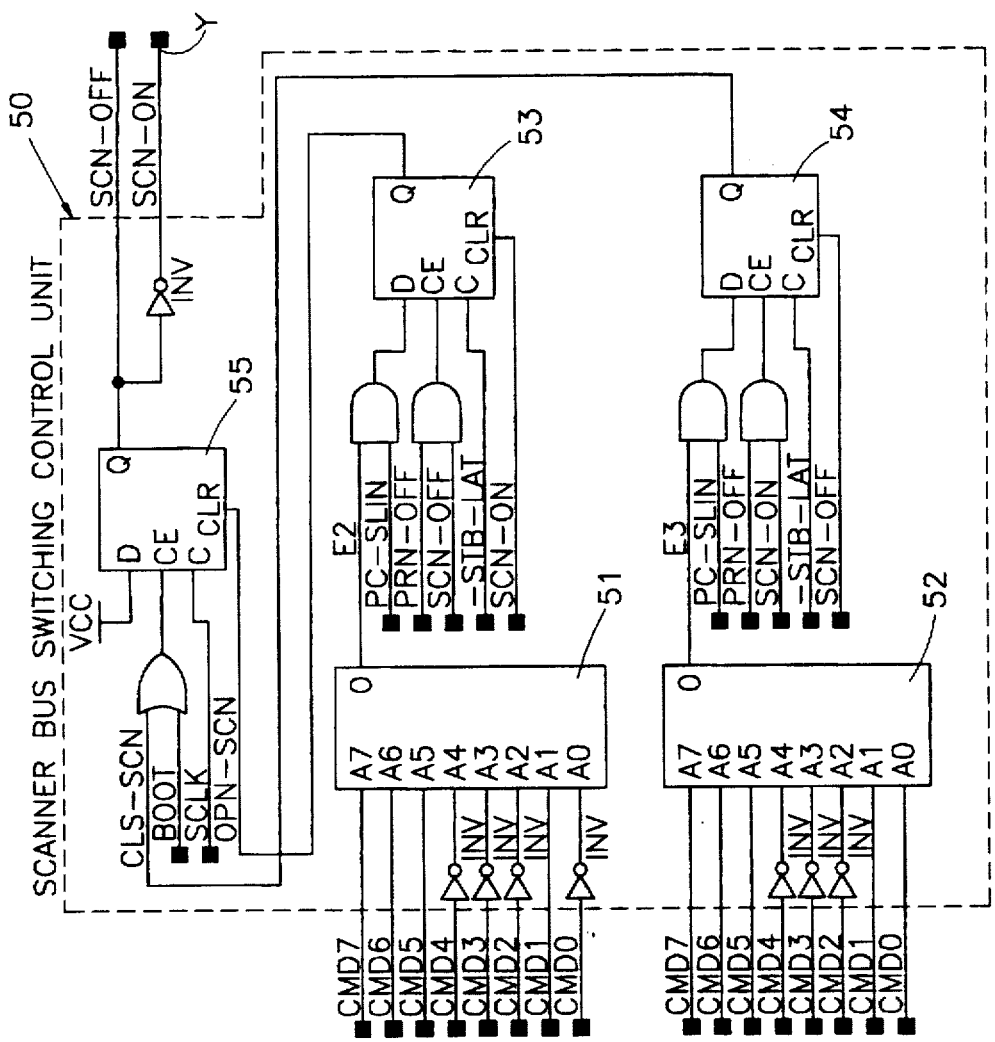

FIGS. 2A and 2B respectively show the detailed circuit of the printer bus switching control unit 40 and the scanner bus switching control unit 50. The printer bus switching control unit 40 comprises two AND gates 41 and 42, two input AND gates 43-45, D flip-flops 46 and 49, sixteen-bit shift register 47 and sixteen pin AND gate 48. The AND gates 41 and 42 have eight input terminals of which seven input terminals are connected to the data bus CDM1–CDM7. The D flip-flop 46 has a clock input connected to bit 0 of the data bus (CDM0).

The AND gates 42, 44 and 45, D flip-flop 47 and sixteen pin AND gate 48 are used to determine if an identification code associated with printer-off status is received which in the embodiment illustrated is sixteen successive pairs of hexadecimal "E6" and "E7". The AND gates 41 and 43 and D flip-flop 46 are used to determine if an identification code associated with printer-on status is received which in the embodiment illustrated is a sequence of hexadecimal "E8" and "E9".

The output of the sixteen pin AND gate 48 is connected to the clear terminal CLR of the D flip-flop 49 for clearing and setting the output signal X of the D flip-flop 49 to logic low (namely, de-activating the printer), while the output of the D flip-flop 46 is connected to the chip enable terminal of the D flip-flop 49 for enabling the D flip-flop 49 to generate a logic high level output (namely activating the printer).

The scanner bus switching control unit 50 has a circuit structure similar to the printer bus switching control unit 40, wherein the scanner bus switching control unit 50 comprises two eight input terminal AND gates 51 and 52 connected to CDM0–CDM7 of the data bus and two D flip-flops 53 and 54 respectively connected to the outputs of the AND gates 51 and 52. A D flip-flop 55 for generating the output signal Y has a clear terminal CLR connected to the D flip-flop 53 and a chip enable terminal CE connected to the D flip-flop 54. The output signal Y controls the activation/de-activation of the scanner 80.

In the embodiment illustrated, a hexadecimal "E2", together with the switching of the strobe signal STB from logic high level to logic low level, the strobe signal serving as clock signal of the D flip-flop 53, is used to activate the scanner 80. A hexadecimal "E3", together with the switching of the strobe signal STB from logic high level to logic low level, serves to de-activate the scanner 80.

Figure 3C:
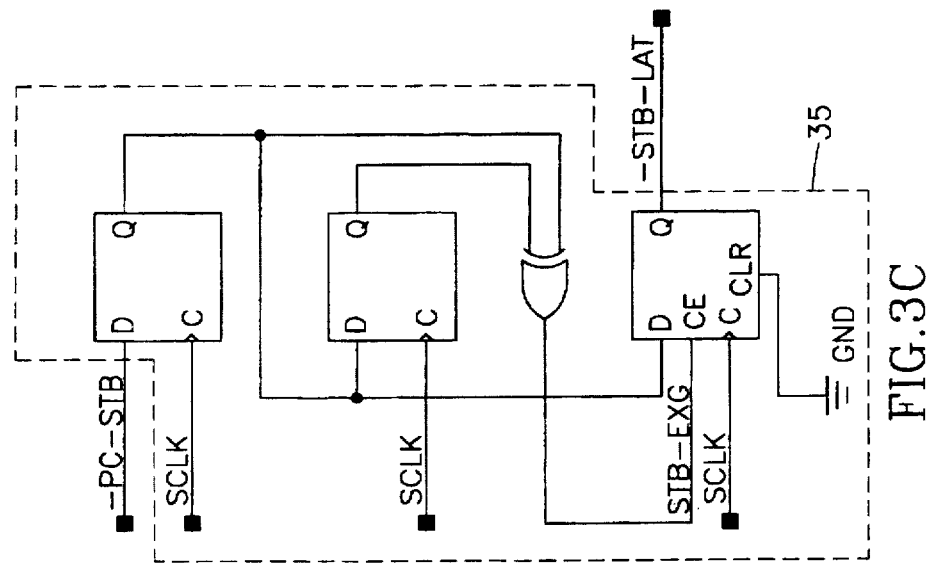
FIG. 3C shows the detailed circuit of the debounce circuit of the present invention.
Figure 3A:
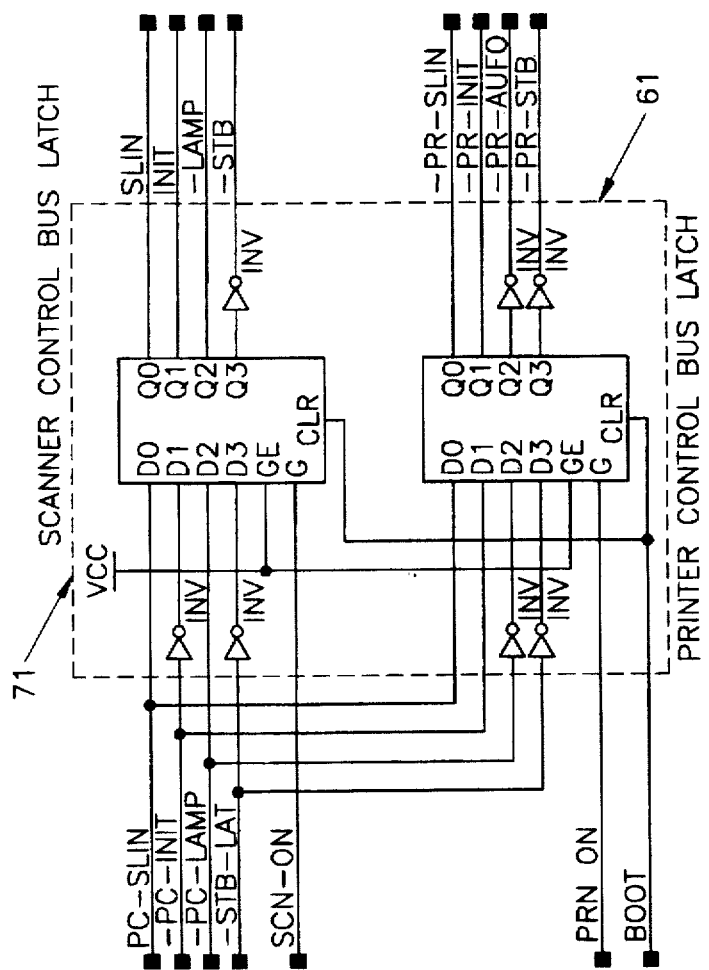
FIG. 3A shows the printer control bus latch and the scanner control bus latch.
Figure 3B:
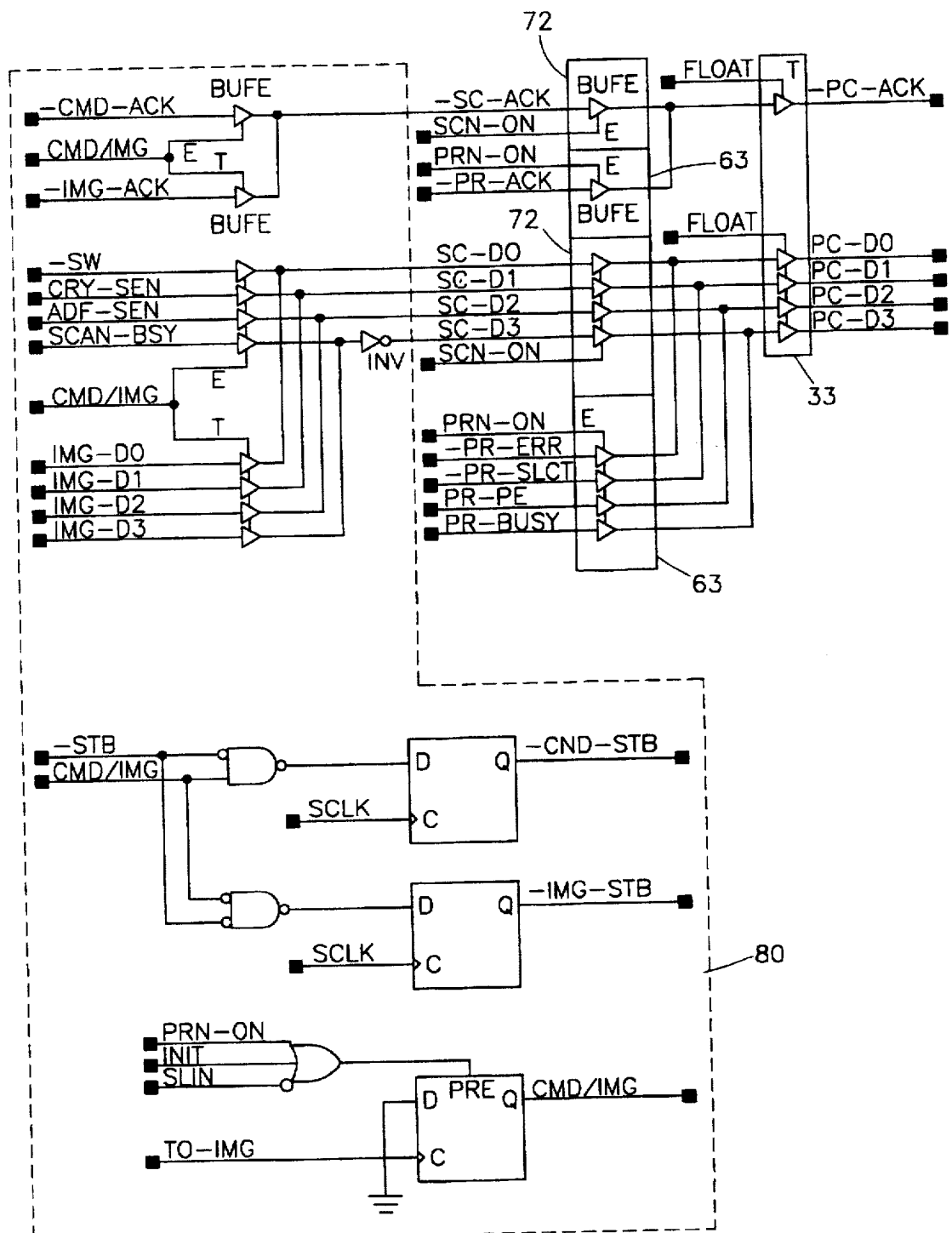
FIG. 3B shows the connection between the scanner circuit and the scanner status bus tri-state buffer in accordance with the present invention.

The other components, such as the latches 61 and 71, tri-state buffers 63 and 72 and other buffers, for example the buffer 33, and debounce circuit 32, are illustrated in more detail in FIGS. 3A, 3B and 3C. Also shown in FIG. 3B is a portion of the scanner circuit 80 which are connected to the scanner status bus tri-state buffer 72.

As shown in FIG. 3C, the debounce circuit 32 comprises a plurality of D flip-flops and an exclusive OR gate, which shapes and debounces the strobe signal PC_STB from the computer 10 and generating the debounced strobe signal STB_LAT. FIG. 3B shows the structure of the printer status bus tri-state buffer 63 and the scanner status bus tri-state buffer 72 and the connection between the scanner circuit 80 and the scanner status bus tri-state buffer 72, together with the buffer 33 which is connected to the printer status bus tri-state buffer 63. FIG. 3A shows two D flip-flops constitute the printer and scanner control bus latches 61 and 71.

Figure 4:
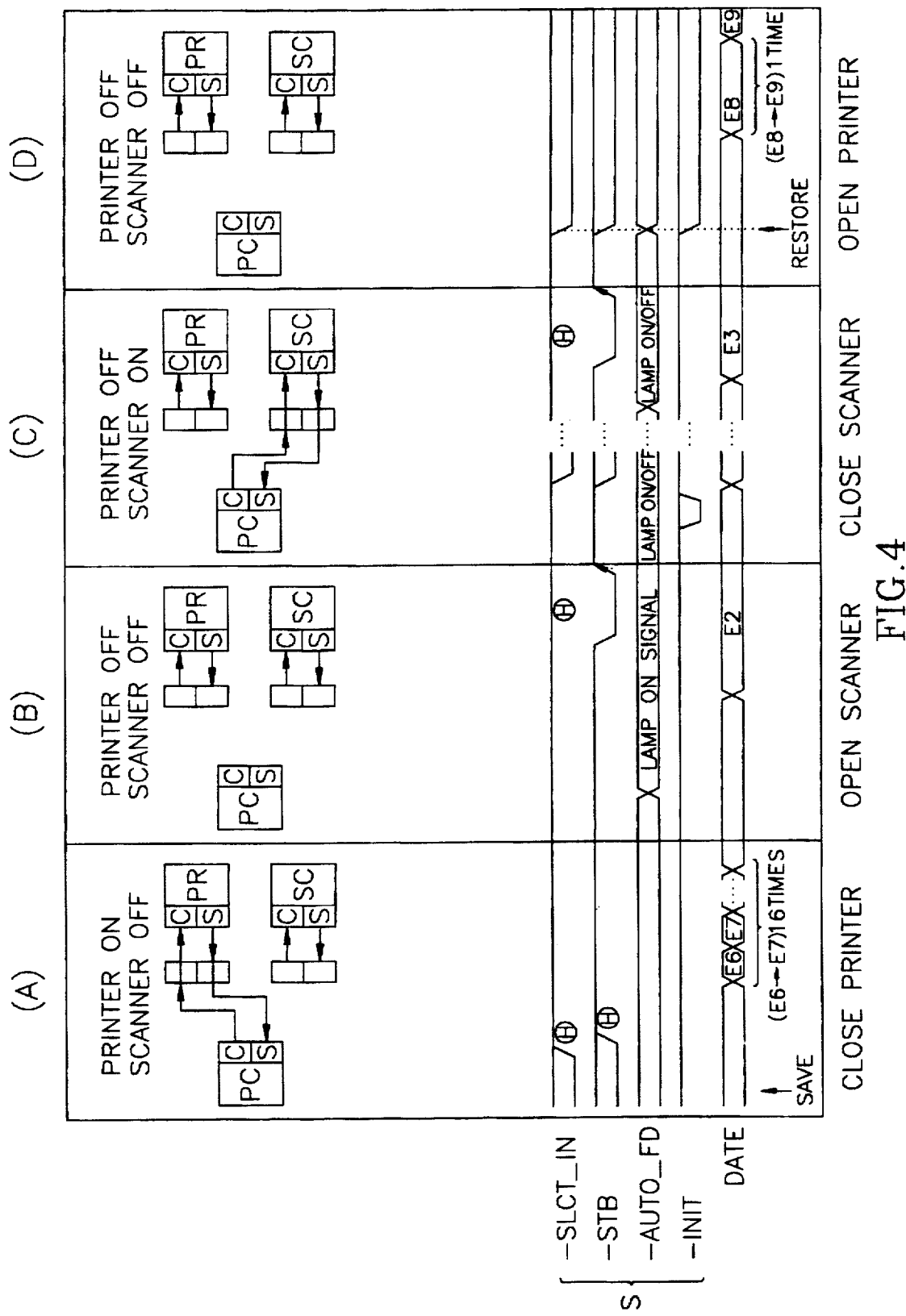
FIG. 4 shows timing and status diagram of the present invention, wherein four columns are illustrated, respectively corresponding to the conditions of (A) printer-on and scanner-on, (B) printer-off and scanner-off, (C) printer-off and scanner-on and (D) printer-off and scanner-off.

In the control of switching operation in accordance with the present invention, with reference to FIG. 4, wherein four columns respectively indicating different operation conditions are shown, at the top of each of the columns, the ON/OFF status of the printer 20 and scanner 80 are shown in succession from printer-on, scanner-off to printer-off, scanner-off and then printer-off, scanner-on and finally back to printer-off and scanner-off (in the drawing, PC represents the computer device 10, PR stands for printer 20 and SC indicates scanner 80, C is control signal and S is status signal), each column comprising at the lower side thereof timing diagrams showing the time relationship of the control signals on the control bus and the data on the data bus. In accordance with the present invention, in the initial boot condition, the control device 30 of the present invention automatically set the printer on which corresponds to the left outer column (column A). In the initial condition of column A of FIG. 4, to switch the on-line connection with the computer PC from the printer PR to the scanner SC, the current status of the control signals of the parallel port of the computer PC is stored by the computer PC and the selection signal SLCT_IN and strobe signal STB are maintained at logic high level and a series of sixteen pairs of hexadecimal "E6" and "E7" sent through the data bus to make the lower portion of the printer bus switching control unit 40 that is shown at the left half of FIG. 2 to open (disable) the printer control bus latch 61 and the printer status bus tri-state buffer 63. This corresponds to the off-line (or de-activated) condition of the printer PR shown in column B of FIG. 4 wherein the scanner SC is still off and thus both the printer and scanner are off at this moment. To turn on or activate the scanner SC, a hexadecimal "E2" is sent through the data bus and when the strobe signal STB is in rising condition, the scanner SC is activated and on line with the computer device PC, as shown in column C of FIG. 4. When the scanning operation is completed, to turn off the scanner SC and restore the connection between the printer PR and the computer PC, a hexadecimal "E3" is sent through the data bus and when the strobe signal STB is rising, the scanner SC is switched off as shown in column D of FIG. 4. At this moment, both the printer and the scanner are off.

Once the scanner SC is switched off, the original control status of the printer PR is restored and hexadecimal "E8" and "E9" codes are sequentially sent through the data bus to have the printer activated and on line with the computer which correspond to the condition shown in column A of FIG. 4.

In accordance with the present invention, the automatic feed signal AUTO_FD of the control bus from the computer PC is temporarily used to turn ON/OFF an indicator lamp (not shown) of the scanner SC to indicate the ON/OFF status of the scanner SC.

In the switching operation shown in FIG. 4, an off-line condition of both the printer and the scanner is provided between the on-line condition of the printer and that of the scanner. This solves the problem of errors caused by directly switching between the printer and the scanner. Besides such an indirect switching operation, identification codes are also sent through the data terminals to serve as the control basis of the switching operation. Particularly, when it is switched from the printer to the scanner, the present invention provides a design of repeating the "E6" and "E7" codes sixteen times to the control device of the present invention before the switching operation can be performed which provides operation safety and switching reliability. No mistaken switching operation from the printer to the scanner may occur.

In switching to the scanner, the selection signal SLCT_IN is maintained in the logic high and the strobe signal STB and the automatic feed signal AUTO_FD are used to confirm the switching operation and to turn on the scanner indicator lamp. In switching to the printer, all the control signals are not modified and this allows the present invention to be applicable to PnP printers of any type without adverse interference.

To this point, it is understood that the present invention provides a control method for switching between printer and scanner which is completely independent of the control signals from the computer parallel port and thus solving the problem encountered in the prior art technique. Further, a buffering period (both printer and scanner off) is provided between the printer on and scanner on conditions so as to reduce the potential errors that occur in the prior art direct switching technique.

The above description is made with respect to the preferred embodiment of the present invention and for those skilled in the art, it is possible to make a variety of modifications and changes to the above-described circuit without departing from the scope and spirit of the present invention. All these modifications and changes should be considered within the scope of the present invention as defined in the appended claims.

What is claimed is:

1. A device for switching a scanner having a printer port adapted to connect a printer between a scanning circuit of the scanner and the printer comprising:

a first connector adapted to connect to a parallel port of a computer to receive control signals, status signals and data signals therefrom along control bus, status bus and data bus;

a second connector for connection with the printer, having control bus connected to the control bus of the first connector via a first latch, status bus connected to the status bus of the first connector via a first tri-state buffer and data bus in direct connection with the data bus of the first connector;

the scanning circuit comprising a second latch for connecting the control bus of the first connector to the scanning circuit and a second tri-state buffer for connecting the status bus of the first connector to the scanning circuit, the scanning circuit being in connection with the data bus of the first connector;

a first control unit connected to the data bus of the first connector to receive first and second data signals from the computer via the data bus, the first control unit comprising first decoding means for decoding the first data signals to generate a first output signal and a second decoding means for decoding the second data signal to generate a second output signal, the first output signal being applied to the first latch and first tri-state buffer to disable the first latch and the first tri-state buffer for blocking the connection of control bus and status bus between the first and second connectors, the second output being applied to the first latch and first tri-state buffer to enable the first latch and the first tri-state buffer for establishing the connection of control bus and status bus between the first and second connectors; and a second control unit connected to the data bus of the first connector to receive third and fourth data signals from the computer via the data bus, the second control unit comprising third decoding means for decoding the third data signal to generate a third output signal and a fourth decoding means for decoding the fourth data signal to generate a fourth output signal, the third output being applied to the second latch and second tri-state buffer to enable the second latch and the second tri-state buffer for establishing the connection of the control bus and the status bus of the first connector to the scanning circuit, the fourth output being applied to the second latch and second tri-state buffer to disable the second latch and the second tri-state buffer for cutting off the connection of the control bus and status bus of the first connector to the scanning circuit;

the control bus of the first connector having a first control signal and a second control signal applied to the first and second control units for the generation of the first, second, third and fourth output signals.

2. The device as claimed in claim 1, further comprising a debounce circuit connected to the first connector to receive and process the second control signal and to applied a processed second control signal to the second connector, the scanning circuit and the first and second control units.

3. The device as claimed in claim 2, wherein the second control signal is a strobe signal.

4. The device as claimed in claim 1, further comprising buffers arranged between the control buses and status buses of the first and second connectors.

5. The device as claimed in claim 1, further comprising a buffer arranged on the data bus between the first connector and the scanning circuit.

6. The device as claimed in claim 1, wherein the first data signal comprises a number of successive and repeated data pairs and wherein the first decoding means comprises a multiple bit shift register and a multiple input terminal AND gate corresponding to the number of the hexadecimal data pairs.

7. The device as claimed in claim 6, wherein the successive and repeated data comprises hexadecimal E6 and E7.

8. The device as claimed in claim 1, wherein the second data signal comprises hexadecimal E8 and E9.

9. The device as claimed in claim 1, wherein the third data signal comprises hexadecimal E2.

10. The device as claimed in claim 1, wherein the fourth data signal comprises hexadecimal E3.

11. A method for controlling switching operation between a scanner having a built-in printer port to which a printer is connected and the printer, the scanner being connected to a parallel port of a computer to receive data signals, control signals and status signals via data bus, control bus and status bus from the parallel port, the data signals being applied to scanning circuit of the scanner and the printer, the control signals and status signals being applied to the scanning circuit and the printer via first and second latching/storing means respectively, the method comprising the steps of:

(a) initially activating the printer by having the first latching/storing means enabled to allow the control signals and the status signals to transmit to the printer and having the second latching/storing means disabled to prohibit the control signals and the status signals from transmitting to the scanning circuit so as to de-activate the scanning circuit;

(b) in switching from the printer to the scanning circuit, storing the control signals, modifying and maintaining a plurality of the control signals at a first logic state, and sending a first data signal via the data bus to control means, the control means decoding the first data signal to generate a first output signal which is applied to the first latching/storing means to disable the first latching/storing means and de-activate the printer;

(c) sending a second data signal via the data bus to the control means, the control means decoding the second data signal to generate a second output signal which is applied to the second latching/storing means to enable the second latching/storing means to activate the scanning circuit with the control signals and status signals transmitted to the scanning circuit via the enabled second latching/storing means;

(d) in switching from the scanning circuit to the printer, sending a third data signal via the data bus to the control means, the control means decoding the third data signal to generate a third output signal which is applied to the second latching/storing means to disable the second latching/storing means and thus de-activate the scanning circuit; and (e) restoring the previously stored control signals and send a fourth data signal to the control means, the control means decoding the fourth data signal to generate a four output signal which is applied to the first latching/storing means to enable the first latching/storing means to allow the control signals and the status signals to transmit to the printer for activating the printer.

12. The method as claimed in claim 11, wherein the first logic state is a logic high level and wherein the plurality of control signals comprises control bus selection signal and control bus strobe signal.

13. The method as claimed in claim 11, wherein the plurality of control signals are maintained at the given first logic state when the printer is de-activated.

14. The method as claimed in claim 11, wherein first data signal comprises a series of two successively and alternately repeated data.

15. The method as claimed in claim 14, wherein the two successively and alternately repeated data comprise hexadecimal E6 and E7.

16. The method as claimed in claim 14, wherein the series of two successively and alternately repeated data comprise repeating the two data sixteen times.

17. The method as claimed in claim 14, wherein a control bus automatic feed signal is used to control an indicator lamp of the scanner when the printer is de-activated.

18. The method as claimed in claim 11, wherein the scanning activating step of step (c) further comprises a step of changing one of the plurality of control signals from the first logic state to a second logic state to enable the control means to decode the second data signal.

19. The method as claimed in claim 18, wherein the one of the plurality of the control signals is a control bus strobe signal.

20. The method as claimed in claim 11, wherein the second data signal comprises hexadecimal E2.

21. The method as claimed in claim 11, wherein the scanning de-activating step of step (d) further comprises a step of changing one of the plurality of control signals from the first logic state to a second logic state to enable the control means to decode the third data signal.

22. The method as claimed in claim 21, wherein the one of the plurality of the control signals is a control bus strobe signal.

23. The method as claimed in claim 11, wherein the second data signal comprises hexadecimal E3.

24. The method as claimed in claim 11, wherein the fourth data signal comprises sequential hexadecimal E8 and E9.

* * * * *